July 22, 1958
R. BLANK ET AL
2,844,215
KNOCK-DOWN AIR FILTER
Filed April 25, 1955
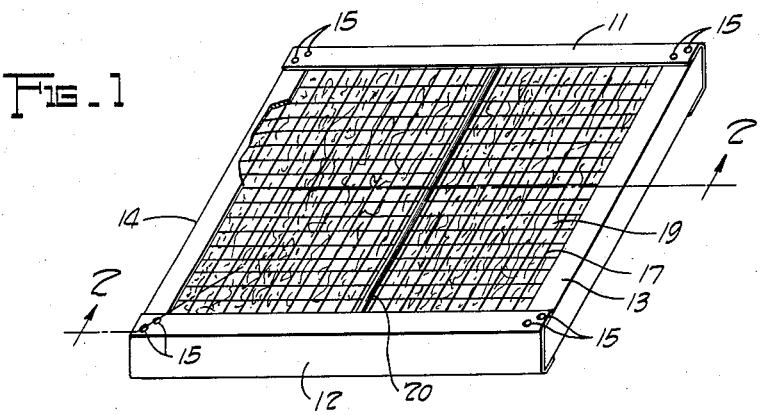
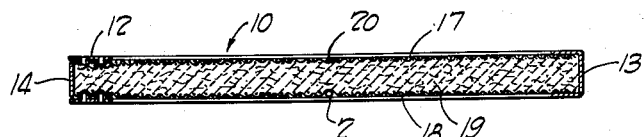
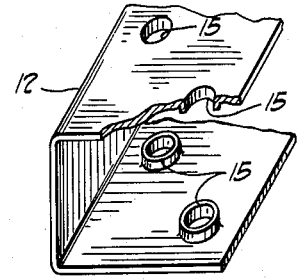
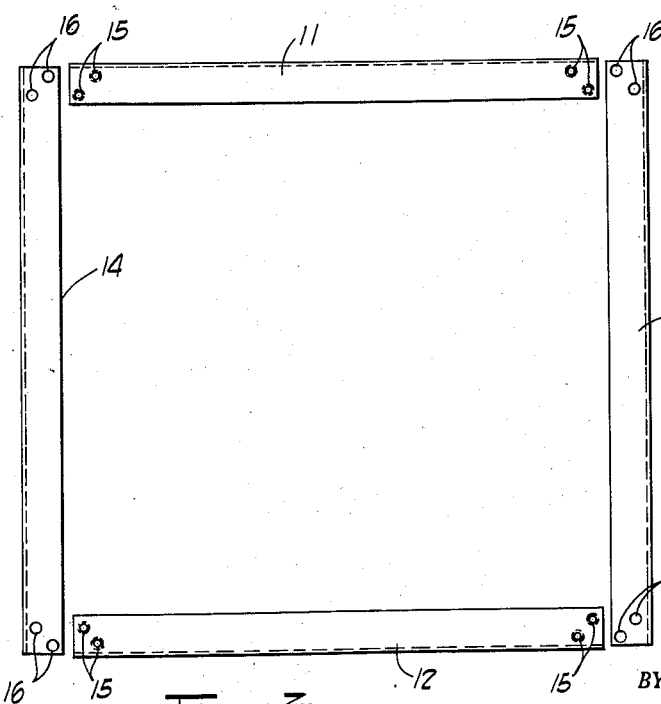
INVENTORS
JACK BLANK
ROBERT BLANK
BY
Sanford Schuurmacher
ATTORNEY

United States Patent Office 2,844,215
Patented July 22, 1958

2,844,215

KNOCK-DOWN AIR FILTER

Robert Blank, Cleveland Heights, and Jack Blank, Euclid, Ohio; Bertha Fenster and Goldie Lake, executrices of said Robert Blank, deceased, assignors to said Jack Blank Application April 25, 1955, Serial No. 503,654

1 Claim. (Cl. 183—49)

This invention relates to an improved air filter of the type which employs a mass of porous material for the filtering medium.

Conducive to a better understanding of this invention, it may be well to point out that so-called "air-conditioning" units for domestic and commercial use ordinarily employ means for either heating, cooling, or both heating and cooling the air in the area to be conditioned, depending upon the season of the year. The air to be treated is continuously recirculated, under pressure, through a heat transfer zone and then distributed through suitably positioned ducts.

In addition, it is common practice to admit a small volume of outside air to the system to freshen it. All the air is periodically pulled from the conditioned area and then returned thereto, after treatment, at relatively high velocities. The air in the conditioned area is therefore kept in continuous motion, which prevents stagnation and creates a feeling of general well being and comfort in the occupants of the area. However, this constant air movement also creates a condition wherein dust in the area is kept in constant motion and together with new dust carried in by the outside air, added to the system from time to time, would eventually result in an unhealthy dust laden environment were not some means provided for removing such dust from the treated air.

This is commonly done by passing the air through a filtering medium made up of a mass of porous material positioned across the path of the air stream. With air filters of this type, the mass of filtering material is ordinarily held in a four-sided open framework which has a skeletonized network across the two open faces of the framework. In use, the pressure of the air flow pushes the downstream side of the framework against its supporting member and provides a seal, so that the air is forced to pass through the filtering medium.

A fluffy mass of glass fibers is the usual filtering medium, but other bulky filtering media may be used such as an open mass of plastic fibers or the like. Such filters eventually become loaded with dust and must be cleaned or replaced to restore their filtering effectiveness. Cleaning of such filters is a messy and time-consuming procedure and it has become the common practice to use so-called "throw-away" filters which are discarded when dirty and replaced by new ones. Each air-conditioning unit requires two or more such filtering elements which should be replaced several times a year, depending upon the amount of air pollution present, if peak efficiency is to be maintained. While the cost of the actual filtering media is relatively low, the cost of manufacturing and packaging the supporting framework brings the cost of the assembled filter to a relatively high figure. The cost of replacing such filters is a factor in the servicing of the air-conditioning unit and leads some manufacturers to use fewer filters than called for, for optimum filtering efficiency. Similarly, the user is discouraged from replacing the filters as often as required because of the cost involved.

The primary object of this invention, therefore, is to provide an air filter assembly that is merchandised in disassembled or knock-down form, to be assembled by the user.

Another object is to provide such a filter assembly having filter media that may be easily removed and replaced by fresh media in the original framework, without requiring the use of any tools.

A further object is to provide a knock-down filter having component parts that may be easily interlocked to form a supporting framework for the filter medium, that is rigid and dimensionally stable.

Still other objects are to provide an air filter of the type stated that is inexpensive to manufacture; that can be packaged in a small space; and can be easily assembled and serviced by the user.

These and other objects of the invention will become apparent from a reading of the following specifications and claim, together with the accompanying drawing wherein:

Figure 1 is a perspective view of the assembled knock-down air filter that is the subject of this invention;

Figure 2 is a vertical sectional view of the same taken along the line and in the direction of the arrows 2—2 of the Figure 1;

Figure 3 is an exploded view of the framework;

Figure 4 is an enlarged perspective end view of one of the channel members showing the male locking element; and Figure 5 is an enlarged perspective end view of one of the channel members showing the female locking element.

Referring more particularly to the drawing, there is seen in the Figure 1 the assembled air filter broadly indicated by the reference numeral 10, that is the subject of this invention.

The device is shown in its assembled form, but it is to be understood that it is packaged in compact knock-down form, for assembly by the ultimate user. Thus the cost of labor, for assembly, which is the major factor in the cost of prior art devices, is eliminated and passed on to the consumer as a substantial saving to him.

The filter comprises a four-sided open framework made up of sheet metal channels 11, 12, 13 and 14 which are butted against each other to provide a light but rigid structure having two open faces. The channels are fabricated from sheet iron of a suitable gage and are given a protective coating of corrosion resisting material or may be made from aluminum if that metal should become competitive.

The end portions of channels 11 and 12 are extruded inwardly to provide male locking elements 15 which are tubular in cross section, as is seen most clearly in Figure 4. The dependent male extrusions 15 on the top wall of channels 11 and 12 are opposed to similar elements extruded upwardly from the bottom wall. While one pair of opposed extrusions will serve, it has been found that a more rigid assembly will be provided if two pair of male extrusions are used at each end of the channels 11 and 12. The two pair of male extrusions are aligned on a line lying at an angle of 45° to the long axis of each channel, as illustrated.

Channels 13 and 14 have similarly opposed holes or female locking elements 16, which are punched in their upper and lower walls at the ends thereof. These paired holes 16 are also aligned at an angle of 45° to the long axis of each channel, as shown in Figure 5.

The four channels are abutted with the ends of channels 13 and 14 nested between the walls of channels 11 and 12. In this position, the male extrusions 15 of channels 11 and 12 interfit and seat in the female sockets 16 of channels 13 and 14, thus locking the four channels together in a casing that is rigid and dimensionally stable. There is enough inherent flexibility in the thin channel walls to permit the walls to flex momentarily to permit the holes 16 to be interlocked by the tubular extrusions 15. The length of the tubular extrusions 15 is such that they will extend slightly beyond the faces of the walls of channels 13 and 14 so that they will not be disengaged from the sockets 16 unless said walls are intentionally flexed.

Reference numerals 17 and 18 indicate squares of open mesh wire screening of a size such that their bounding edges will underlay the top and bottom channel walls when placed within the framework, as shown in Figures 1 and 2.

Reference numeral 19 indicates a sheet of filtering medium composed of loosely compacted glass fibers which are impregnated with a light oil to increase their dust attracting properties. The inherent resiliency of this filter medium is such that the wire networks 17 and 18 will be held against their bounding channels when the filter element 19 is sandwiched therebetween.

Two stiff wire rods 20 and 21 extend across the framework on top of the networks 17 and 18 respectively to add rigidity to the wire networks. The filter, so assembled, is ready to be inserted in the air-conditioning unit in the conventional manner.

When the filter medium 19 becomes clogged with dust, it may be easily replaced by removing the top rod 20 and network 17 from the channel framework by merely pulling upward on them, since they may be easily flexed. The exposed filter medium 19 may then be pulled out of the framework and a fresh sheet substituted. The network and rod 17 and 20 are then replaced and the renewed filter is ready for use.

The knock-down filter, as described, may be easily packaged in a tubular carton by positioning the four channels 11, 12, 13 and 14 and the two rods 20 and 21 side by side and then rolling the filter sheet 19 and wire networks 17 and 18 therearound. So packaged, the unit can be readily shipped and stored in a small space, in contrast with conventional assembled filters which are bulky and cumbersome to handle and store. Furthermore, the replaceable filter sheets 19 are relatively inexpensive and may be easily replaced at small cost to the user.

If it is necessary to dis-assemble the framework, for any reason, this may be done by merely reversing the procedure outlined above. It will be noted that no tools are required in the assembling or dis-assembling of the framework.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

We claim:

In combination with air filtering media, a knock-down air-filter casing for said media, comprising a four sided open framework having sides of sheet metal channels whose walls may be flexed slightly relative one to the other, and which are butted against each other in the framework to provide a light but rigid structure having two open faces, a wire network positioned across each of said open faces, the networks being spaced apart by the filtering media positioned therebetween, with their edge portions positioned in the channels, two of said channels having paired and opposed straight walled tubular extrusions positioned at the ends thereof, on a line lying at an angle of 45° to the long axis of the channels, which interfit paired and opposed holes aligned at a similar angle to the long axis of the remaining two abutting channels in the assembled casing, at the ends thereof, to give the casing rigidity and dimensional stability.

References Cited in the file of this patent

UNITED STATES PATENTS

| | | |
|---|---|---|
| 1,867,226 | Martin | July 12, 1932 |
| 2,333,026 | McDonough | Oct. 26, 1943 |
| 2,677,436 | Mazek | May 4, 1954 |